US012597596B2

(12) United States Patent
Liu et al.

(10) Patent No.: US 12,597,596 B2
(45) Date of Patent: Apr. 7, 2026

(54) NANO-SILICON-GRAPHITE COMPOSITE NEGATIVE ELECTRODE MATERIAL WITH CARBON COATING AND ALUMINUM METAPHOSPHATE COMPOSITE MODIFICATION LAYER ON SURFACE AND PREPARATION METHOD THEREOF

(71) Applicant: CHINA NONFERROUS METAL (GUILIN) GEOLOGY AND MINING CO., LTD., Guilin (CN)

(72) Inventors: Wenping Liu, Guilin (CN); Haiqing Qin, Guilin (CN); Xiaoxu Lei, Guilin (CN); Anjun Lu, Guilin (CN); Zhenjun Zhang, Guilin (CN); Zuxue Mo, Guilin (CN); Huijie Tang, Guilin (CN); Guanghai Meng, Guilin (CN)

(73) Assignee: CHINA NONFERROUS METAL (GUILIN) GEOLOGY AND MINING CO., LTD., Guilin (CN)

( * ) Notice: Subject to any disclaimer, the term of this patent is extended or adjusted under 35 U.S.C. 154(b) by 486 days.

(21) Appl. No.: 18/124,632

(22) Filed: Mar. 22, 2023

(65) Prior Publication Data

US 2023/0231114 A1     Jul. 20, 2023

Related U.S. Application Data

(63) Continuation of application No. PCT/CN2022/094412, filed on May 23, 2022.

(30) Foreign Application Priority Data

Apr. 29, 2022     (CN) ......................... 202210473280.2

(51) Int. Cl.
  *H01M 4/36*          (2006.01)
  *H01M 4/02*          (2006.01)
(Continued)

(52) U.S. Cl.
  CPC ........... *H01M 4/366* (2013.01); *H01M 4/386* (2013.01); *H01M 4/587* (2013.01); *H01M 2004/027* (2013.01)

(58) Field of Classification Search
  CPC ...... H01M 4/134; H01M 4/364; H01M 4/366; H01M 4/386; H01M 4/404; H01M 4/0471;
  (Continued)

(56) References Cited

U.S. PATENT DOCUMENTS

2009/0004569 A1     1/2009 Yamamoto et al.

FOREIGN PATENT DOCUMENTS

CN          106025211 Y     10/2016
CN          106257716 Y     12/2016
  (Continued)

*Primary Examiner* — Aiqun Li
(74) *Attorney, Agent, or Firm* — Hemisphere Law, PLLC

(57)          ABSTRACT

A nano-silicon-graphite composite negative electrode material with carbon coating and aluminum metaphosphate composite modification layer on surface and its preparation method are disclosed, which is mainly prepared from following components by mass percentage: 4-10 wt. % of aluminum metaphosphate, 10 wt. % of asphalt cracking carbon, 15 wt. % of spherical nano-silicon powder, and 71-65 wt. % of graphite powder. A nano-silicon powder is added to deionized water for ultrasonic dispersion to obtain a uniform dispersion, then graphite powder is added to mix uniformly, and then waterborne asphalt is added. After stirring and mixing evenly, spray drying is carried out, and the dried powder is compounded with metaphosphate for mechanical fusion. Finally, the same is transferred into vacuum furnace for high-temperature carbonization to obtain the product. The composite modification layer existing on the surface can well inhibit the corrosion of the nano-silicon material by electrolytes, alleviate volume
(Continued)

expansion, improve electrical conductivity, and increase cycle life.

3 Claims, 2 Drawing Sheets

(51) Int. Cl.
    *H01M 4/38*           (2006.01)
    *H01M 4/587*         (2010.01)
(58) Field of Classification Search
    CPC .. H01M 4/625; H01M 4/1393; H01M 4/1395;
              H01M 4/587; H01M 2004/027; H01M
                         10/0525; Y02E 60/10
    See application file for complete search history.

(56)              References Cited

FOREIGN PATENT DOCUMENTS

| | | | |
|---|---|---|---|
| CN | 109671942 | A | 4/2019 |
| CN | 111048756 | Y | 4/2020 |
| CN | 112133894 | Y | 12/2020 |

1

NANO-SILICON-GRAPHITE COMPOSITE NEGATIVE ELECTRODE MATERIAL WITH CARBON COATING AND ALUMINUM METAPHOSPHATE COMPOSITE MODIFICATION LAYER ON SURFACE AND PREPARATION METHOD THEREOF

CROSS REFERENCE TO RELATED APPLICATION

This patent application is a continuation application of PCT/CN2022/094412, filed on May 23, 2022, which claims the benefit and priority of Chinese Patent Application No. 202210473280.2, filed on Apr. 29, 2022, the disclosure of which is incorporated by reference herein in its entirety as part of the present application.

TECHNICAL FIELD

The present disclosure relates to the technical field of electrochemical power supply, and more specifically, to a nano-silicon-graphite composite negative electrode material with carbon coating and aluminum metaphosphate composite modification layer on surface and its preparation method.

BACKGROUND ART

Silicon intercalates lithium by forming a lithium silicon alloy with lithium. The lithium intercalation process involves huge volume expansion, and the delithiation de-alloying process involves violent volume shrinkage. The volume change is up to 300%, which easily causes the pulverization of the silicon material and seriously affects the cycle stability. By preparing a nano-silicon powder with a suitable particle size, the particle pulverization of the silicon material during the electrochemical cycle can be effectively solved. However, there is still huge volume change effect on the nanosilicon material after lithium intercalation. After repeated volume expansion and shrinkage of the electrode, the particles still suffer from electrical contact loss and pulverization, which causes capacity loss and causes cycle life attenuation. An existing mature commercial graphite negative electrode material is adopted as a base skeleton composite nano-silicon material to compensate for the inherent disadvantages of a silicon-based material, so as to obtain a new composite negative electrode material with a specific capacity and a cycle life meeting the requirements of a negative electrode material of a lithium-ion battery, which is an effective and feasible low-cost method.

However, after the nano-silicon is composited with the graphite, the expansion shrinkage rates of the deintercalated lithium of the nano-silicon and the graphite are different, which tends to cause the nano-silicon particles lose electrical contact, resulting in capacity loss. At the same time, the SEI film formed on the surface is unstable, the electrolyte is continuously consumed, and the transmission of lithium ions of the batty is hindered, thereby causing the cycle life of the material to be reduced. Furthermore, the cycle life is currently improved primarily by nanonizing the silicon material and compounding it with other materials. However, after nanonizing the silicon material, the silicon material has a large specific surface area, and the surface is easily corroded by the electrolytic solution. Moreover, the expansion of lithium intercalation is still present after nanonizing the silicon material, so that further surface modification is required. The present disclosure achieves a nano-silicon-graphite composite negative electrode material with long cycle life by performing carbon coating and metaphosphoric acid composite modification on the material surface in a simple and feasible manner.

SUMMARY

In view of the above, an object of the present disclosure is to provide a nano-silicon-graphite composite negative electrode material with carbon coating and aluminum metaphosphate composite modification layer on surface and its preparation method.

In order to achieve the above purpose, technical solutions of the present disclosure are specifically described as follows.

A nano-silicon-graphite composite negative electrode material with carbon coating and aluminum metaphosphate composite modification layer on surface is provided, and the negative electrode material is mainly prepared from following components by mass percentage:

4-10 wt. % of aluminum metaphosphate, 10 wt. % of asphalt cracking carbon, 15 wt. % of spherical nano-silicon powder, and 71-65 wt. % of graphite powder.

Another technical object of the present disclosure is to provide a preparation method of the above nano-silicon-graphite composite negative electrode material with carbon coating and aluminum metaphosphate composite modification layer on surface, which includes the method and steps for preparing the carbon coating and aluminum metaphosphate composite modification layer on the surface, and a nano silicon-graphite composite material and using same as a silicon-carbon composite material for a lithium ion battery; wherein, the preparation method involved in the present disclosure is as follows:

First, nano-silicon powder is added to deionized water for ultrasonic dispersion to obtain a uniform dispersion, then graphite powder is added to mix uniformly, and then waterborne asphalt is added. After stirring and mixing evenly, spray drying is carried out, and the dried powder is compounded with metaphosphate for mechanical fusion. Finally, the same is transferred into vacuum furnace for high-temperature carbonization to obtain a nano-silicon-graphite composite negative electrode material with carbon coating and aluminum metaphosphate composite modification layer on surface.

Specifically, the preparation method includes the following steps:

1) adding a nano-silicon powder into deionized water according to a formulation, ultrasonically stirring and dispersing same to obtain a nano-silicon powder dispersion;

2) stirring the suspension of step 1) at a high speed, adding a graphite powder according to a formulation ratio, stirring and mixing same for a certain time, then adding a waterborne asphalt, stirring same at a high speed until uniform, and at the same time, adding deionized water to control a solid content of the suspension to be within a range of 10-15 wt. %;

3) spray-drying the suspension of step 2) using a spray dryer to obtain a dry powder, wherein the spray inlet temperature is controlled at 200-220° C., and the feed rate is controlled at 20-30 kg/h;

4) weighing an aluminum metaphosphate powder according to a formulation ratio, adding same to the dry powder of step 3), mixing uniformly, and then adding same to a mechanical fusion machine for fusion to obtain a precursor coated with a layer of asphalt and aluminum metaphosphate modification on surface;

5) transferring the precursor in step 4) into a vacuum furnace, performing high-temperature carbonization on the precursor at 800-1200° C. for 3-6 h, and then taking same out for crushing and sieving to obtain a nano-silicon-graphite composite negative electrode material with carbon coating and aluminum metaphosphate composite modification layer on surface.

It should be noted that, in the present disclosure, by modifying the carbon coating layer on the surface of the nano-silicon-graphite composite negative electrode material, the binding strength between nano-silicon and graphite is well improved, and the conductivity of the silicon material is improved; and by modifying the aluminum metaphosphate on the surface, the volume expansion is well alleviated, and the SEI film formed on the surface of the material is stabilized. Based on the preparation of nano-silicon-graphite composite negative electrode material by compounding nano-silicon and graphite, the disclosure enhances the conductivity of nano-silicon particles through surface carbon coating and aluminum metaphosphate composite modification layer, stabilizes the SEI film, and cases the volume change of the material to obtain a composite negative electrode material with higher cycle life.

Compared with the prior art, the disclosure provides a nano-silicon-graphite composite negative electrode material with carbon coating and aluminum metaphosphate composite modification layer on surface and its preparation method, which has the following beneficial effects:

1) The presence of the composite modification layer not only has the effects of traditional carbon coating, such as improving the conductivity of the silicon material, isolating the erosion of the electrolyte on the silicon material, alleviating volume expansion, etc., but also enhancing the peeling strength of the coating layer by dispersing aluminum metaphosphate in the coating layer, thus better adapting to the volume change of the material.

2) The presence of aluminum metaphosphate may help to form a stable SEI film on the surface of the material, reduce the consumption of electrolyte, and obtain a higher cycle life.

BRIEF DESCRIPTION OF THE DRAWINGS

In order to explain the embodiments of the present disclosure or the technical solutions in the prior art more clearly, the following drawings that need to be used in the description of the embodiments or the prior art are briefly introduced. Obviously, the drawings in the following description are only embodiments of the present disclosure. For those of ordinary skill in the art, other drawings can be obtained based on the drawings disclosed without creative work.

DETAILED DESCRIPTION OF THE EMBODIMENTS

Technical solutions in the embodiments of the present disclosure will be clearly and completely described below with reference to the attached drawings of the specification. Obviously, the described embodiments are only part of the embodiments of the present disclosure, not all of them. Based on the embodiments of the disclosure, all other embodiments made by those skilled in the art without sparing any creative effort should fall within the protection scope of the disclosure.

The present disclosure provides a preparation method of a nano-silicon-graphite composite negative electrode material with carbon coating and aluminum metaphosphate composite modification layer on surface.

The technical solutions of the present disclosure will be further described below in conjunction with specific embodiments, but the content of the present disclosure is not limited to the following embodiments.

Embodiment 1

A preparation method of a nano-silicon-graphite composite negative electrode material with carbon coating and aluminum metaphosphate composite modification layer on surface specifically includes the following steps:

1) adding 450 g of nano-silicon powder into 27 kg of deionized water, ultrasonically stirring and dispersing same to obtain a nano-silicon powder suspension;

2) stirring the suspension of step 1) at a high speed, adding 1950 g of graphite powder, stirring well and mixing same uniformly, then adding 1200 g of waterborne asphalt (solid content 50 wt. %, vacuum carbonization carbon residue 50 wt. %), and mixing uniformly to obtain a uniform slurry with a solid content of about 10 wt. %;

3) spray-drying the uniform slurry obtained in step 2) while ultrasonically stirring, controlling the spray inlet temperature to be 220° C. and the feed rate to be 30 kg/h, and obtaining a dry powder;

4) weighing 300 g of aluminum metaphosphate powder, adding same and the dry powder obtained in step 3) together into a mechanical fusion machine, performing extrusion fusion at a high speed for 20 min, and obtaining a precursor coated with a layer of asphalt and aluminum metaphosphate modification on surface;

5) transferring the precursor in step 4) into a vacuum furnace, performing carbonization on the precursor under vacuum at 800° C. for 3 h to carbonizing the asphalt at high temperature, and obtaining a nano-silicon-graphite composite negative electrode material with about 10 wt. % of asphalt cracking carbon and 10 wt. % of aluminum metaphosphate composite modification layer on surface.

Figure 2:
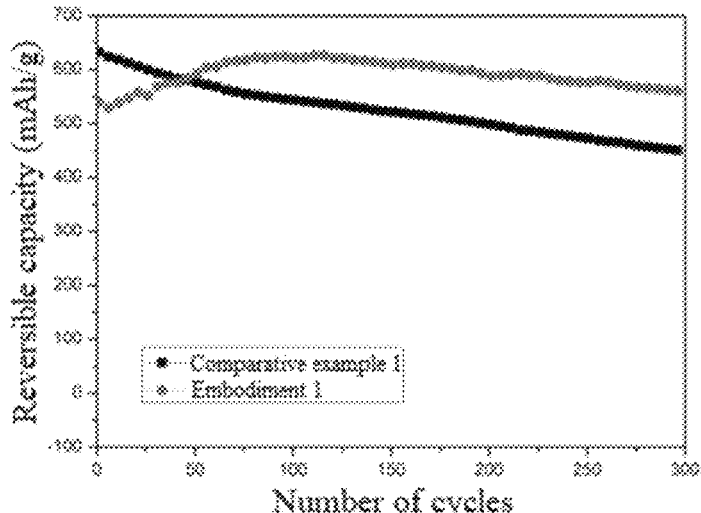
FIG. 2 is a graph of a capacity retention ratio obtained by testing after the silicon-carbon composite material prepared according to embodiment 1 and comparative example 1 of the present disclosure is manufactured into a negative plate and then assembled into a 2032 button battery.

The nano-silicon-graphite composite negative electrode material prepared in this embodiment was prepared into a negative plate, and assembled into a 2032 button battery to test the cycle life. The material performance data is shown in Table 1, and the cycle life curve is shown in FIG. 2.

The method for testing the cycle performance of a battery includes: firstly, discharging the battery to 0.01V at a current density of 100 mA/g, then discharging the battery to 0.005 V at a current of 10 mA/g, leaving the battery to stand for 3 min, and then charging the battery to 1.5 V at a current density of 100 mA/g, thus testing the cycle performance in a cycle.

Figure 1:
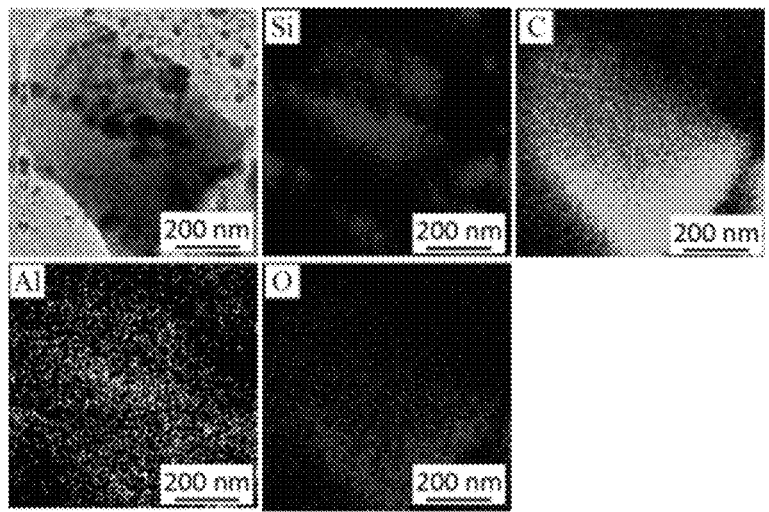
FIG. 1 shows the energy spectrum analysis of the nano-silicon-graphite composite negative electrode material with aluminum metaphosphate composite modification on surface prepared by the disclosure.

In addition, the energy spectrum analysis is carried out on the nano-silicon-graphite composite negative electrode material with aluminum metaphosphate modification on surface prepared by the disclosure, as shown in FIG. 1. It can be seen from the energy spectrum that nano-silicon particles are dispersed on the surface of graphite particles in the composite material, and the particles are combined into a whole through the carbon coating and aluminum metaphosphate modification layer on the surface.

Embodiment 2

A preparation method of a nano-silicon-graphite composite negative electrode material with carbon coating and aluminum metaphosphate composite modification layer on surface specifically includes the following steps:

1) adding 450 g of nano-silicon powder into 27 kg of deionized water, ultrasonically stirring and dispersing same to obtain a nano-silicon powder suspension;

2) stirring the suspension of step 1) at a high speed, adding 2130 g of graphite powder, stirring well and mixing same uniformly, then adding 1200 g of waterborne asphalt (solid content 50 wt. %, vacuum carbonization carbon residue 50 wt. %), and mixing uniformly to obtain a uniform slurry with a solid content of about 10 wt. %;

3) spray-drying the uniform slurry obtained in step 2) while ultrasonically stirring, controlling the spray inlet temperature to be 200° C. and the feed rate to be 30 kg/h, and obtaining a dry powder;

4) weighing 120 g of aluminum metaphosphate powder, adding same and the dry powder obtained in step 3) together into a mechanical fusion machine, performing extrusion fusion at a high speed for 20 min, and obtaining a precursor coated with a layer of asphalt and aluminum metaphosphate modification on surface;

5) transferring the precursor in step 4) into a vacuum furnace, performing carbonization on the precursor under vacuum at 800° C. for 6 h to carbonizing the asphalt at high temperature, and obtaining a nano-silicon-graphite composite negative electrode material with about 10 wt. % of asphalt cracking carbon and 4 wt. % of aluminum metaphosphate composite modification layer on surface.

Embodiment 3

A preparation method of a nano-silicon-graphite composite negative electrode material with carbon coating and aluminum metaphosphate composite modification layer on surface specifically includes the following steps:

1) adding 450 g of nano-silicon powder into 17 kg of deionized water, ultrasonically stirring and dispersing same to obtain a nano-silicon powder suspension;

2) stirring the suspension of step 1) at a high speed, adding 1950 g of graphite powder, stirring well and mixing same uniformly, then adding 1200 g of waterborne asphalt (solid content 50 wt. % vacuum carbonization carbon residue 50 wt. %), and mixing uniformly to obtain a uniform slurry with a solid content of about 15 wt. %;

3) spray-drying the uniform slurry obtained in step 2) while ultrasonically stirring, controlling the spray inlet temperature to be 200° C. and the feed rate to be 30 kg/h, and obtaining a dry powder;

4) weighing 300 g of aluminum metaphosphate powder, adding same and the dry powder obtained in step 3) together into a mechanical fusion machine, performing extrusion fusion at a high speed for 20 min, and obtaining a precursor coated with a layer of asphalt and aluminum metaphosphate modification on surface;

5) transferring the precursor in step 4) into a vacuum furnace, performing carbonization on the precursor under vacuum at 1000° C. for 6 h to carbonizing the asphalt at high temperature, and obtaining a nano-silicon-graphite composite negative electrode material with about 10 wt. % of asphalt cracking carbon and 10 wt. % of aluminum metaphosphate composite modification layer on surface.

Embodiment 4

A preparation method of a nano-silicon-graphite composite negative electrode material with carbon coating and aluminum metaphosphate composite modification layer on surface specifically includes the following steps:

1) adding 450 g of nano-silicon powder into 22 kg of deionized water, ultrasonically stirring and dispersing same to obtain a nano-silicon powder suspension;

2) stirring the suspension of step 1) at a high speed, adding 2010 g of graphite powder, stirring well and mixing same uniformly, then adding 1200 g of waterborne asphalt (solid content 50 wt. %, vacuum carbonization carbon residue 50 wt. %), and mixing uniformly to obtain a uniform slurry with a solid content of about 122 wt. %;

3) spray-drying the uniform slurry obtained in step 2) while ultrasonically stirring, controlling the spray inlet temperature to be 210° C. and the feed rate to be 30 kg/h, and obtaining a dry powder;

4) weighing 240 g of aluminum metaphosphate powder, adding same and the dry powder obtained in step 3) together into a mechanical fusion machine, performing extrusion fusion at a high speed for 20 min, and obtaining a precursor coated with a layer of asphalt and aluminum metaphosphate modification on surface;

5) transferring the precursor in step 4) into a vacuum furnace, performing carbonization on the precursor under vacuum at 1200° C. for 3 h to carbonizing the asphalt at high temperature, and obtaining a nano-silicon-graphite composite negative electrode material with about 10 wt. % of asphalt cracking carbon and 8 wt. % of aluminum metaphosphate composite modification layer on surface.

Embodiment 5

A preparation method of a nano-silicon-graphite composite negative electrode material with carbon coating and aluminum metaphosphate composite modification layer on surface specifically includes the following steps:

1) adding 450 g of nano-silicon powder into 27 kg of deionized water, ultrasonically stirring and dispersing same to obtain a nano-silicon powder suspension;

2) stirring the suspension of step 1) at a high speed, adding 2070 g of graphite powder, stirring well and mixing same uniformly, then adding 1200 g of waterborne asphalt (solid content 50 wt. %, vacuum carbonization carbon residue 50 wt. %), and mixing uniformly to obtain a uniform slurry with a solid content of about 10.4 wt. %;

3) spray-drying the uniform slurry obtained in step 2) while ultrasonically stirring, controlling the spray inlet temperature to be 220° C. and the feed rate to be 30 kg/h, and obtaining a dry powder;

4) weighing 180 g of aluminum metaphosphate powder, adding same and the dry powder obtained in step 3) together into a mechanical fusion machine, performing extrusion fusion at a high speed for 20 min, and obtaining a precursor coated with a layer of asphalt and aluminum metaphosphate modification on surface;

5) transferring the precursor in step 4) into a vacuum furnace, performing carbonization on the precursor under vacuum at 1100° C. for 4 h to carbonizing the asphalt at high temperature, and obtaining a nano-silicon-graphite composite negative electrode material with about 10 wt. % of asphalt cracking carbon and 6 wt. % of aluminum metaphosphate composite modification layer on surface.

In order to further verify the excellent effects of the application of the present disclosure compared with the prior art, the following comparative experiment and performance test are further performed, and the specific contents are as follows:

Comparative Example 1

1) adding 450 g of nano-silicon powder into 27 kg of deionized water, ultrasonically stirring and dispersing same to obtain a nano-silicon powder suspension;

2) stirring the suspension of step 1) at a high speed, adding 1950 g of graphite powder, stirring well and mixing same uniformly, then adding 1200 g of waterborne asphalt (solid content 50 wt. % vacuum carbonization carbon residue 50 wt. %), and mixing uniformly to obtain a uniform slurry with a solid content of about 10 wt. %;

3) spray-drying the uniform slurry obtained in step 2) while ultrasonically stirring, controlling the spray inlet temperature to be 220° C. and the feed rate to be 30 kg/h, and obtaining a dry powder;

4) transferring the precursor in step 3) into a vacuum furnace, performing carbonization on the precursor under vacuum at 800° C. t for 3 h to carbonizing the asphalt at high temperature, and obtaining a nano-silicon-graphite composite negative electrode material with only a carbon coating layer on surface and without aluminum metaphosphate modification.

The nano-silicon-graphite composite negative electrode material without surface modification in comparative example 1 was assembled into a 2032 button battery for testing cycle life, and material performance data is shown in Table 1, and the cycle life curve is as shown in FIG. 2.

Comparative Example 2

1) adding 450 g of nano-silicon powder into 27 kg of deionized water, ultrasonically stirring and dispersing same to obtain a nano-silicon powder suspension;

2) stirring the suspension of step 1) at a high speed, adding 1950 g of graphite powder, stirring well and mixing same uniformly, then adding 1200 g of waterborne asphalt (solid content 50 wt. %, vacuum carbonization carbon residue 50 wt. %), and mixing uniformly to obtain a uniform slurry with a solid content of about 10 wt. %;

3) spray-drying the uniform slurry obtained in step 2) while ultrasonically stirring, controlling the spray inlet temperature to be 220° C. and the feed rate to be 30 kg/h, and obtaining a dry powder;

4) transferring the precursor in step 3) into a vacuum furnace, performing carbonization on the precursor under vacuum at 800° C. for 3 h to carbonizing the asphalt at high temperature, and obtaining a nano-silicon-graphite composite negative electrode material with only aluminum metaphosphate modification and without carbon coating layer on surface.

The nano-silicon-graphite composite negative electrode material without surface modification in comparative example 2 was assembled into a 2032 button battery for testing cycle life, and material performance data is shown in Table 1.

Embodiment 3

1) adding 450 g of nano-silicon powder into 27 kg of deionized water, ultrasonically stirring and dispersing same to obtain a nano-silicon powder suspension;

2) stirring the suspension of step 1) at a high speed, adding 1950 g of graphite powder, stirring well and mixing same uniformly, and obtaining a uniform slurry with a solid content of about 10 wt. %;

3) spray-drying the uniform slurry obtained in step 2) while ultrasonically stirring, controlling the spray inlet temperature to be 220° C. and the feed rate to be 30 kg/h, and obtaining a dry powder;

4) transferring the precursor in step 3) into a vacuum furnace, performing carbonization on the precursor under vacuum at 800° C. for 3 h, and obtaining a nano-silicon-graphite composite negative electrode material with neither carbon coating layer nor aluminum metaphosphate modification on the surface.

The nano-silicon-graphite composite negative electrode material without surface modification in comparative example 3 was assembled into a 2032 button battery for testing cycle life, and material performance data is shown in Table 1.

As can be seen from Table 1, the sample of comparative example 3 without surface modification had a capacity retention ratio of only 28.4% after 300 cycles, the sample of comparative example 1 with only the carbon coating layer modification had a capacity retention ratio of 70.7% after 300 cycles, the sample of comparative example 2 with only aluminum metaphosphate modification had a capacity retention ratio of 46.2% after 300 cycles. While, after carbon coating and aluminum metaphosphate composite modification, the cycle life of the material was significantly improved, and after 300 cycles, the capacity retention ratios of the samples in embodiments 1 to 5 were 103.7%, 87.8%, 104.3%, 102.8%, and 104.4%, respectively. It can be found through comparative analysis that the carbon coating and aluminum metaphosphates composite modification layer designed in the present disclosure can greatly improve the cycle life of the nano-silicon-graphite composite negative electrode material.

TABLE 1

| Sample | First discharging capacity (mAh/g) | First reversible charging capacity (mAh/g) | Reversible charging capacity after 300 cycles (mAh/g) | Retention rate (%) |
|---|---|---|---|---|
| Embodiment 1 | 645.7 | 540.2 | 560.2 | 103.7 |
| Embodiment 2 | 671.6 | 551.4 | 483.9 | 87.8 |
| Embodiment 3 | 645.2 | 532.1 | 554.8 | 104.3 |
| Embodiment 4 | 633.2 | 549.7 | 565.1 | 102.8 |
| Embodiment 5 | 647.6 | 555.8 | 580.2 | 104.4 |

TABLE 1-continued

| Sample | First discharging capacity (mAh/g) | First reversible charging capacity (mAh/g) | Reversible charging capacity after 300 cycles (mAh/g) | Retention rate (%) |
|---|---|---|---|---|
| Comparative example 1 | 744.8 | 632.7 | 447.3 | 70.7 |
| Comparative example 2 | 731.4 | 638.3 | 294.6 | 46.2 |
| Comparative example 3 | 809.9 | 694.5 | 197.2 | 28.4 |

The above description of the disclosed embodiments enables the skilled in the art to achieve or use the disclosure. Multiple modifications to these embodiments will be apparent to those skilled in the art, and the general principles defined herein may be achieved in other embodiments without departing from the spirit or scope of the disclosure. The present disclosure will therefore not be restricted to these embodiments shown herein, but rather to comply with the broadest scope consistent with the principles and novel features disclosed herein.

What is claimed is:

1. A preparation method of a nano-silicon-graphite composite negative electrode material with a carbon coating and an aluminum metaphosphate composite modification layer on its surface, wherein the nano-silicon-graphite composite negative electrode material is prepared from a formulation of following components by mass percentage: 4-10 wt. % of an aluminum metaphosphate, 10 wt. % of an asphalt cracking carbon, 15 wt. % of a spherical nano-silicon powder, and 71-65 wt. % of a graphite powder, and the preparation method comprises the following steps:

S1. adding a nano-silicon powder into deionized water according to the formulation, ultrasonically stirring and dispersing to obtain a nano-silicon powder suspension;

S2. stirring the suspension of S1 at a high speed, adding a graphite powder according to the formulation, stirring and mixing well, then adding a waterborne asphalt, stirring at a high speed until uniform, and at the same time, adding deionized water to control a solid content of the suspension to be within a range of 10-15 wt. %;

S3. spray-drying the suspension of S2 using a spray dryer to obtain a dry powder;

S4. weighing an aluminum metaphosphate powder according to the formulation, adding to the dry powder of S3, mixing uniformly to obtain a mixture, and then adding the mixture to a mechanical fusion machine for extrusion fusion for 20 min to obtain a precursor coated with a layer of an asphalt and an aluminum metaphosphate modification on its surface;

S5. transferring the precursor in S4 into a vacuum furnace, performing high-temperature carbonization on the precursor to obtain a carbonized precursor, and then taking the carbonized precursor out for crushing and sieving to obtain the nano-silicon-graphite composite negative electrode material with a carbon coating and an aluminum metaphosphate composite modification layer on its surface.

2. The preparation method of claim 1, wherein in S3, a spray inlet temperature is 200-220° C., and a feed rate is 20-30 kg/h.

3. The preparation method of claim 1, wherein in S5, a temperature of the high-temperature carbonization is 800-1200° C., and a duration of the carbonization is 3-6 h.

* * * * *